United States Patent [19]
Kimura et al.

[11] Patent Number: 5,122,999
[45] Date of Patent: Jun. 16, 1992

[54] COMPACT DISK PLAYER

[75] Inventors: Toshiyuki Kimura; Fumio Endo, both of Kawagoe, Japan

[73] Assignee: Pioneer Electronic Corporation, Tokyo, Japan

[21] Appl. No.: 409,832

[22] Filed: Sep. 20, 1989

[30] Foreign Application Priority Data

Oct. 4, 1988 [JP] Japan .................. 63-249034

[51] Int. Cl.$^5$ ............................... G11B 7/00
[52] U.S. Cl. ..................... 369/32; 369/44.11
[58] Field of Search ............ 369/32, 44.32, 44.11

[56] References Cited

U.S. PATENT DOCUMENTS 4,623,993 11/1986 Schlösser .............. 369/44.32
4,701,897 10/1987 Nakagawa ............ 369/44.32
4,841,505 6/1989 Aoyagi ................. 369/44.11

Primary Examiner—Thomas G. Black
Attorney, Agent, or Firm—Sughrue, Mion, Zinn Macpeak & Seas

[57] ABSTRACT

A compact disk player for playing back data recorded on a compact disk. The compact disk has a surface on which a lead-in area, a program area and a lead-out area are distinctly provided. The program area contains data to be played back to which an address is allocated. The compact disk player includes a pickup and a servo mechanism for controlling the position of the pickup. The compact disk player further includes a controller for servo-locking the pickup to a position where the reading of the data contained in the program area is interrupted and controlling the servo mechanism so that the pickup is positioned in a predetermined position allocated with a predetermined address for the sake of subsequent resumption of the data reading if an address of the servo-locked position is outside the program area.

5 Claims, 2 Drawing Sheets

COMPACT DISK PLAYER

BACKGROUND OF THE INVENTION

The present invention relates generally to a compact disk player, and more particularly to a compact disk player in which when reading data out of a compact disk (hereinafter referred to as "CD") is temporarily interrupted, a restart address at the time of resumption of the data reading is determined based on the mechanical position of a pickup.

Description will be given with respect to a CD on which plural pieces of music are recorded.

CDs carry data recorded by pits each being 0.5 $\mu$m in width and 0.9 to 3.2 $\mu$m in length extending in the direction of tracks coaxially formed on the disk, and being spaced apart by 1.6 $\mu$m from the adjacent pit on the same track. A CD player reads data recorded on such a CD by irradiating a laser beam onto the pits and detecting a change in the reflected laser beam.

The CD has a lead-in area, a program area and a lead-out area. TOC (Table Of Contents) data are recorded on the lead-in area. Control signals representing "during-music", "inter-music", "music number", "running play time", etc. are recorded on the program area together with musical signals of individual pieces of music. Control signal representing the end of play is recorded on the lead-out area.

In resumption of data reading following temporary interruption of the data reading, the pickup is locked to a position where the temporary interruption has been taken place and a read address of the CD at that position is read out. The CD is then accessed using this read address as a restart address in order to resume data reading.

Since conventional CD players operates as described above, if reproduction of a recorded music is interrupted near the beginning of the first music recorded on a CD or near the end of the last music, the pickup may be deviated into the lead-in area or lead-out area from the program area due to vibrations of the carriage mounting the pickup, eccentricity of the CD or the like when data reproduction from the CD is restarted.

If the pickup enters into the lead-in area of the CD, reproduction of a recorded music would start from the beginning because the address read out from the TOC indicates the restart address.

If the pickup enters into the lead-out area, reproduction would start from that area where no music signal exists, which creats unnatural acoustic circumstance when reproduction of a recording music is resumed.

SUMMARY OF THE INVENTION

Accordingly, it is an object of the present invention to provide a CD player which presents less unnatural feeling at the time when data reproduction is resumed.

In order to achieve this and other objects, there is provided a CD player for playing back data recorded on a CD having a surface on which a lead-in area, a program area and a lead-out area are distinctly provided wherein the program area contains data to be played back to which an address is allocated, comprising, a pickup movably positioned relative to the surface of the CD for reading the data contained in the lead-in area, the program and the lead-out area, a servo mechanism for controlling the position of the pickup, and control means for servo-locking the pickup to a position where the reading of the data contained in the program area is interrupted and controlling the servo mechanism so that the pickup is positioned in a predetermined position allocated with a predetermined address for the sake of subsequent resumption of the data reading if an address of the servo-locked position is outside the program area.

Under the condition where the data reading or reproduction of the CD has been temporarily interrupted, in order to resume the reproduction of the CD, the servo mechanism servo-locks the pickup so as not to move the same. The control means determines whether or not the address read out of the compact disk is within the program area. If it is not within the program area, the reproduction is resumed from the predetermined position specified by the predetermined address. The predetermined position may either be a start position of the program area or a start position of, for example, a piece of music which reproduction is interrupted.

BRIEF DESCRIPTION OF THE DRAWINGS

The present invention will be further described by way of non-limitative Example with reference to the accompanying drawings, in which.

DESCRIPTION OF THE PREFERRED EMBODIMENTS

Figure 1:
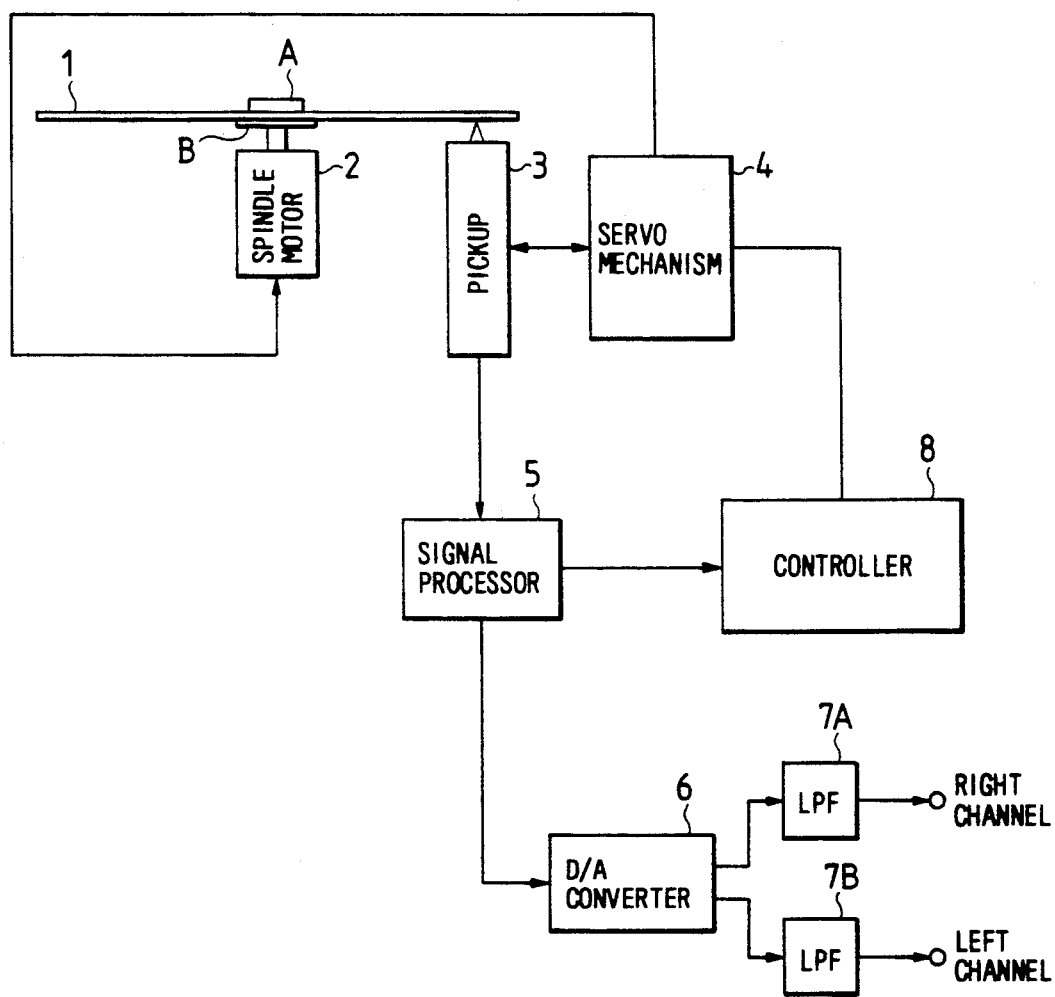
FIG. 1 is a block diagram illustrating a CD player according to an embodiment of this invention.

Referring to FIG. 1, a CD 1 having music data recorded thereon is mounted on a turntable B and clamped by a clamper A. A spindle motor 2 is coupled to the turntable B to rotate the CD 1 mounted thereon. A pickup 3 is positioned beneath the CD 1 to be radially and vertically movable with respect to the CD 1. The pickup 3 irradiates a laser spot onto the rotating CD 1 and receives light reflected therefrom to thereby pickup the data recorded thereon from a change in the reflected light. A serve mechanism is connected to both the spindle motor 2 and the pickup 3 to control the number of revolutions of the spindle motor 2 and the position of the pickup 3 with respect to the CD 1.

A signal processor 5 is connected to the output of the pickup 3 to receive the data read out by the pickup 3. In the signal processor 5, the data received from the pickup 3 is subjected to processing. In the course of signal processing, the signals are separated into right and left channel signals. A digital-to-analog converter (hereinafter referred to as D/A converter 6 is connected to the output of the signal processor 5 to convert a digital signal to an analog signal. Low-pass filters 7A and 7B are connected to the output of the D/A converter 6, and output right- and left-channel analog signals converted by the D/A converter 6.

A controller 8 is connected to the output of the signal processor 5 and controls the servo mechanism 4 based on a control signal fed from the signal processor 5. When the reproduction of the CD is temporarily interrupted and is then resumed, the controller 8 further determines a restart address based on a read address of the CD 1, which read address is the one that is read out by the pickup 3 servo-locked by the servo mechanism 4.

Figure 2:
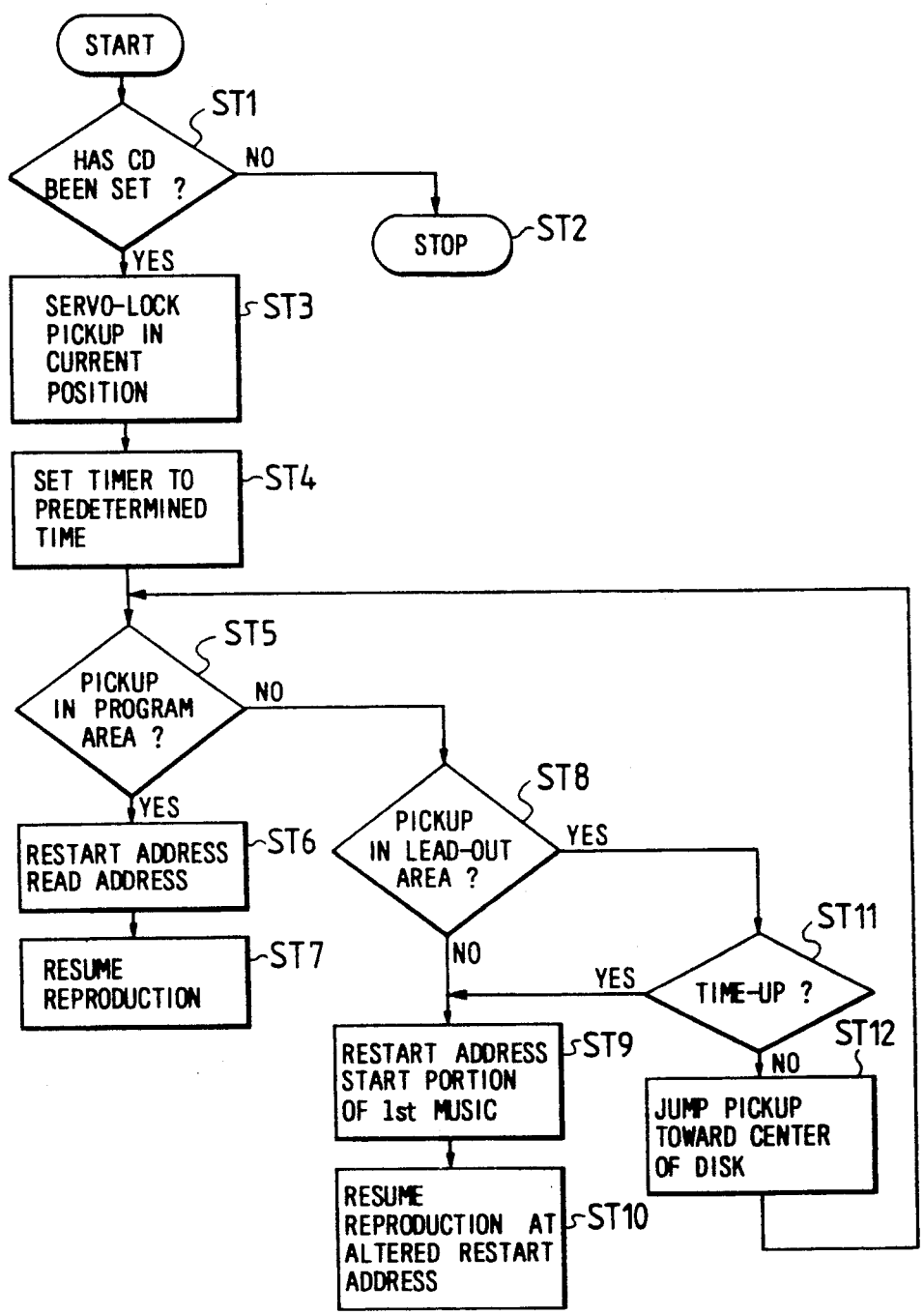
FIG. 2 is a flowchart for description of the operation of the CD player shown in FIG. 1.

FIG. 2 is a flowchart for description of the operation at the time when reproduction is resumed.

The flowchart shown in FIG. 2 is for a CD player which is equipped in a vehicle and in which the pickup 3 does not return to a home position when power is turned off during data reproduction, so that reproduction can be resumed from the position where the interruption has occurred when power is thereafter turned on.

The operation will now be described.

In resuming data reproduction of the CD 1 upon powering after the reproduction is temporarily interrupted by turning off the power, the controller 8 first determines whether or not the CD 1 whose reproduction has been interrupted remains set (step ST1) and stops the process if the CD 1 is not set (step ST2).

If it is determined in step St1 that the CD 1 remains set, the pickup 3 is servo-locked by means of the servo mechanism 4 without being moved from the position where the reproduction has been interrupted (step ST3) and a read address of the CD 1 at the mechanical position is read out by the pickup 3.

Then, a built-in timer is set to a predetermined time (step ST4) and starts measuring a predetermined period of time.

Subsequently, it is determined based on the read address read out by the pickup 3 whether or not the pickup 3 is located within the program area of the CD 1 (step ST5). If the pickup 3 is within this program area, the read address is taken as a restart address (step ST6) and data reproduction from the CD 1 is resumed from the read address (step ST7).

The restart address in steps ST6 and ST7 may be the read address or the start address of a music containing the read address.

If it is determined in step ST5 that the pickup 3 does not lie in the program area of the CD 1, it is then determined whether or not the pickup 3 lies in the lead-out area of the CD 1 (step ST8). If the pickup 3 is not located within the lead-out area, i.e., if the pickup 3 is positioned in the lead-in area of the CD 1, the restart address is altered to the start address of the first music (step ST9) and reproduction from the CD 1 is resumed from the beginning of the first music (step ST10).

If it is determined in step ST8 that the pickup 3 lies within the lead-out area of the CD 1, it is then determined whether or not the time set in the timer has elapsed (step ST11). If the time has not elapsed yet, the servo mechanism 4 is controlled to jump (move) the pickup 3 by a predetermined distance toward the center and the new address is read out (step ST12), then the routine returns to step ST5.

If it is determined in step ST11 that the time set in the timer has elapsed, the routine advances to step ST9.

The above embodiment has been described with reference to the case where if the pickup 3 is within the lead-in area of the CD 1, the start address of the first music recorded is taken as the restart address and if the time set in the timer elapses before the pickup enters the program area from the lead-out area, the start address of the first music recorded is taken as the restart address. This invention may be modified in such a way that if the pickup 3 is within the lead-out area, the start address of the lastly recorded music is taken as the restart address or if it lies outside the program area, the start address of a predetermined music recorded is taken as the restart address.

Although the above description has been given with reference to the CD player in which even if data reproduction is interrupted by turning off power, data reproduction can be resumed upon power-up from the position where the interruption has been taken place, this invention is also applicable to resuming data reproduction in the case where data reproduction is interrupted by invoking a pause as will be done in ordinary CD players, interruption is caused by a tracking error caused by vibration, or the like, with the same effects as attained in the above embodiment. In this case, steps ST1 and ST2 in FIG. 2 can be eliminated.

According to this invention, as described above, at the time when data reproduction from a CD is resumed, if the read address read out by the pickup servo-locked is outside the program area of the CD, the restart address is altered before resuming data reproduction. This can prevent reproduction from the position where no music data is present or prevent the address read out from the TOC data from being taken as the restart address, thus providing less unnatural perception at the time data reproduction is resumed.

What is claimed is:

1. A compact disk player for playing back data recorded on a compact disk having a surface on which a lead-in area, a program area and a lead-out area are successively provided wherein the program area contains data to be played back to which an address is allocated, comprising:

a pickup movably positioned relative to the surface of the compact disk for reading the data contained in the lead-in area, the program area and the lead-out area;

a servo mechanism for controlling the position of said pickup; and control means for servo-locking said pickup at a stop position when the reading of the data of said disk is interrupted, for determining whether or not an address of the stop position is located within the program area, the lead-in area or the lead-out area and for controlling said servo mechanism so that if the address of the stop position is in the lead-in area or the lead-out area, said pickup is positioned in a predetermined position allocated to a predetermined address for a subsequent resumption of the data reading.

2. A compact disk player according to claim 1, wherein if the address of the stop position is within the program area, the data reading is resumed from the position where the reading is interrupted.

3. A compact disk player according to claim 1, wherein if the address of the stop position is within the lead-in area, said predetermined position for the subsequent resumption is an initial position of the program area.

4. A compact disk player according to claim 1, wherein if the address of the stop position is within the lead-out area, said predetermined position for the subsequent resumption is an initial position of the program area.

5. A compact disk player according to claim 1, wherein a plurality of pieces of music are substantially sequentially recorded on the compact disk, and wherein if the stop position is within the program area, the data reading is resumed from an initial position of a piece of music which reproduction is interrupted.

* * * * *